United States Patent [19]
Schmidt

[11] Patent Number: 5,956,932
[45] Date of Patent: Sep. 28, 1999

[54] DECK ATTACHMENT MECHANISM AND METHOD

[75] Inventor: Michael Schmidt, Grafton, Ohio

[73] Assignee: MTD Products Inc, Cleveland, Ohio

[21] Appl. No.: 09/010,603

[22] Filed: Jan. 22, 1998

[51] Int. Cl.$^6$ ................................................ A01D 34/03
[52] U.S. Cl. .............................. 56/15.6; 56/15.7; 56/15.8
[58] Field of Search ...................... 56/15.6, 15.7, 56/15.8, 320.1, 320.2, DIG. 22, DIG. 9

[56] References Cited

U.S. PATENT DOCUMENTS

| 4,490,965 | 1/1985 | Hutchison | 56/11.6 |
| 4,573,308 | 3/1986 | Ehrecke et al. | 56/15.8 |
| 4,760,687 | 8/1988 | Siegrist | 56/15.8 |
| 4,869,057 | 9/1989 | Siegrist | 56/15.9 |
| 4,887,420 | 12/1989 | Cerny, Jr. et al. | 56/320.2 |
| 5,025,617 | 6/1991 | Kuhn et al. | 56/15.6 |
| 5,154,043 | 10/1992 | Schemelin et al. | 56/15.6 |
| 5,157,908 | 10/1992 | Sebben et al. | 56/320.1 |
| 5,226,283 | 7/1993 | Hughes, Jr. | 56/15.6 |
| 5,355,665 | 10/1994 | Peter | 56/15.8 |
| 5,367,864 | 11/1994 | Ogasawara et al. | 56/15.8 |
| 5,425,224 | 6/1995 | Downey et al. | 56/15.8 |
| 5,528,889 | 6/1996 | Kure et al. | 56/15.6 |

FOREIGN PATENT DOCUMENTS 2048638  12/1980  United Kingdom ............. 56/DIG. 22

Primary Examiner—Thomas B. Will
Assistant Examiner—Arpad Fabian Kovacs
Attorney, Agent, or Firm—Emerson & Associates; Roger D. Emerson; Timothy D. Bennett

[57] ABSTRACT

A riding mower is provided and includes a frame, a drive shaft, an engine for selectively rotating the drive shaft, a mower deck having first and second ends, coupling for selectively coupling the drive shaft to the mower deck, a lift cylinder for selectively lifting the mower deck, and a deck attachment mechanism for attaching the mower deck to the frame and to the lift cylinder. The deck attachment mechanism includes a first end link assembly for use in operatively connecting the first end of the mower deck to the frame, a second end link assembly including a first link member having a first link slot for use in operatively connecting the second end of the mower deck to the frame, a frame connection for selectively operatively connecting the first link member to the frame, a quick release pin for selectively operatively connecting the first link member to the mower deck, and a first lift rod having a first end operatively connected to the lift cylinder and a second end operatively received within the first link slot of the first link member. The first lift rod is selectively slidable within the first link slot thereby permitting the mower deck to be easily removed from the side of the riding mower.

22 Claims, 6 Drawing Sheets

DECK ATTACHMENT MECHANISM AND METHOD

BACKGROUND OF THE INVENTION

1. Field of Invention

This invention pertains to the art of methods and apparatuses for attaching a deck to an apparatus, and more specifically to methods and apparatuses for pivotably attaching a liftable mower deck to a riding lawn mower.

2. Description of the Related Art

It is well known to provide riding lawn mowers with mower decks for use in cutting lawns and other such vegetation. These mowers have proven to be adequate for their intended purpose. However, some difficulties have arisen.

One problem in the art of riding lawn mowers is the difficulty in removing the mower deck. Reasons for removing a mower deck may include, removal to perform maintenance on the mower deck, removal to replace one mower deck with another mower deck, and seasonal removal so that, for example, the mower deck is removed for the winter. Of course there are other reasons for removing a mower deck. Added difficulty comes in that some mower decks have a deck extension that extends above the mower deck. This deck extension may prevent the removal of the mower deck from the side of the riding mower without first removing some portion of the deck lift mechanism from the riding mower. Thus, what is needed is a deck attachment mechanism that permits the operator to remove the deck from the side of the riding mower without removing any part of the riding mower and without using tools.

The present invention provides methods and apparatuses for reducing this problem. The difficulties inherent in the art are therefore overcome in a way that is simple and efficient while providing better and more advantageous results.

SUMMARY OF THE INVENTION

According to one aspect of the invention, a riding mower includes a frame, a drive shaft, driving means for rotating the drive shaft, a mower deck having first and second ends, coupling means for selectively coupling the drive shaft to the mower deck, lifting means for selectively lifting the mower deck, and a deck attachment mechanism for attaching the mower deck to the frame and to the lifting means. The deck attachment mechanism includes a first end link assembly for use in connecting the first end of the mower deck to the frame, a second end link assembly including a first link member having a first link slot for use in operatively connecting the second end of the mower deck to the frame, frame connecting means for operatively connecting the first link member to the frame, deck connecting means for operatively connecting the first link member to the mower deck, and a first lift rod having a first end connected to the lifting means and a second end operatively received within the first link slot of the first link member. The first lift rod is slidable within the first link slot.

According to another aspect of the present invention, there is provided a method for removing the mower deck from the riding mower with the deck attachment mechanism. The method includes the steps of disconnecting the deck connecting means, sliding the first lift rod within the first link slot, raising the first link member with the lifting means, disconnecting the first end of the mower deck from the frame with the first end link assembly, de-coupling the drive shaft from the mower deck with the coupling means, and removing the mower deck.

One advantage of the present invention is that mower decks can be easily removed from the side of a riding mower.

Another advantage of the present invention is that the operator does not require any tools to remove the mower deck.

Another advantage of the present invention is that a mower deck having a deck extension above the mower deck can still be easily removed from the side of the riding mower. There is no requirement to lift the riding mower or remove the mower deck from the front of the mower as known in the art.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings, which form a part hereof and wherein.

DESCRIPTION OF THE PREFERRED EMBODIMENTS

Figure 1:
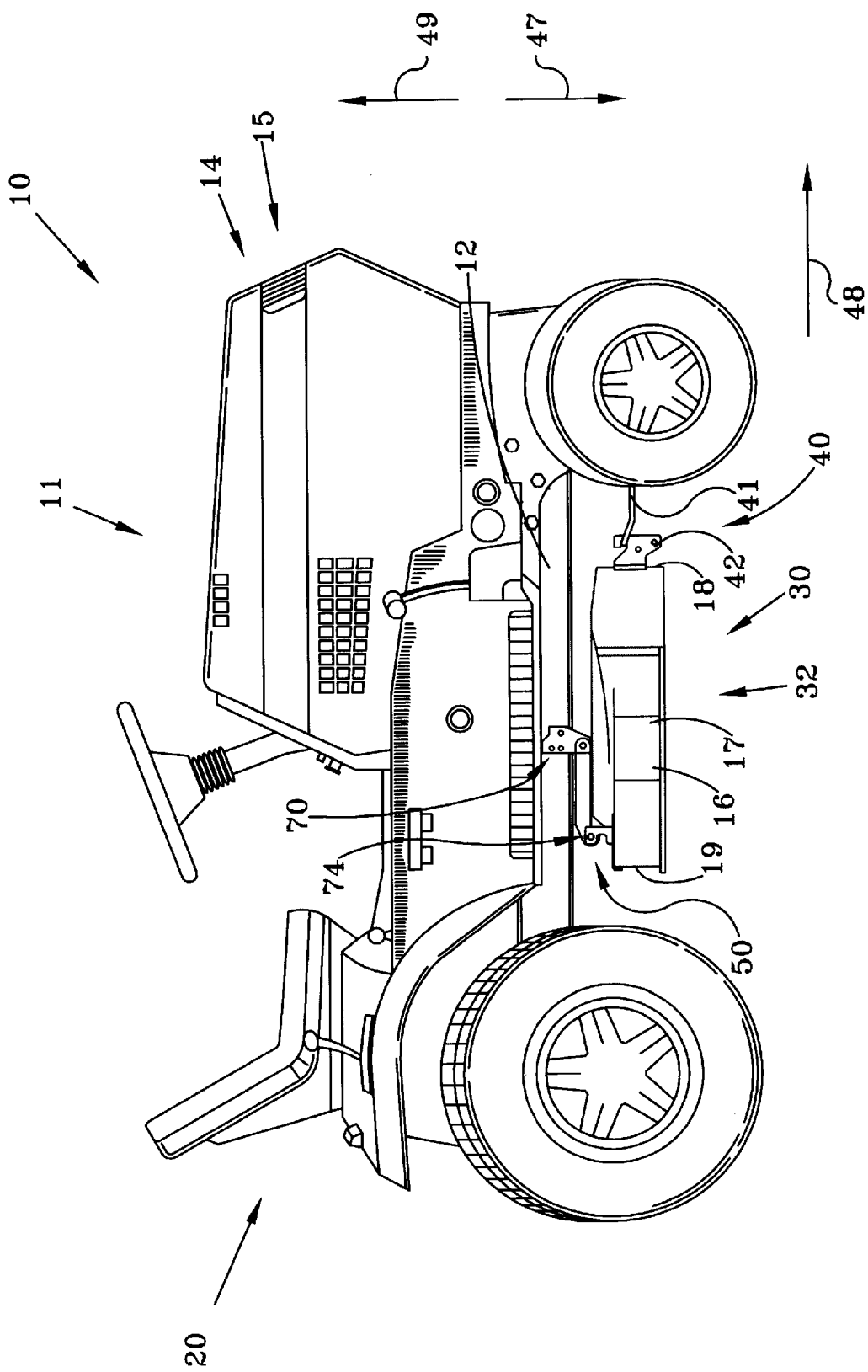
FIG. 1 is a side elevation view of a riding mower having a deck and the deck attachment mechanism of the present invention.

Referring now to the drawings, which are for purposes of illustrating a preferred embodiment of the invention only, and not for purposes of limiting the same, FIG. 1 shows an apparatus 10 that has a deck 16. Although this invention is directed to a riding mower 11 having a mower deck 17, the invention is also applicable to other vehicles, other mowers using any deck chosen with sound engineering judgement and to other applications as well. Throughout this disclosure it should be understood that a forward direction corresponds to direction 48 as shown in FIG. 1, that an upward direction corresponds to direction 49 as shown in FIG. 1, and that a downward direction corresponds to direction 47 as shown in FIG. 1.

Figure 2:
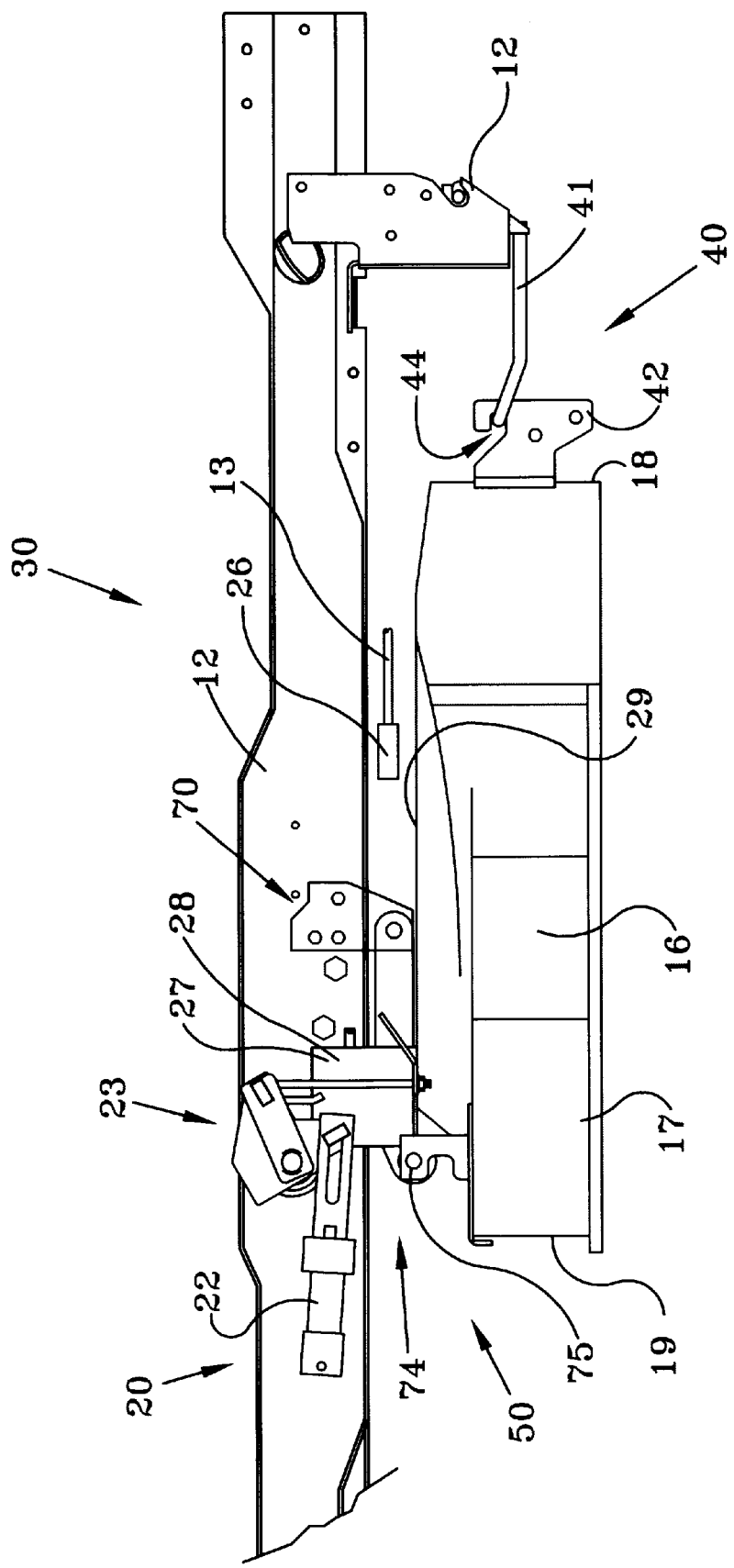
FIG. 2 is an exploded partial side elevation view of the mower deck and the frame of the riding mower showing the first and second end link assemblies.

With reference now to FIGS. 1–2, the riding mower 11 includes a frame 12, a drive shaft 13, and driving means 14 for selectively rotating the drive shaft 13. The driving means 14 can be of any type chosen with sound engineering judgement and may be an engine 15 as is commonly used with riding mowers. The drive shaft 13 is operatively connected to the driving means 14 in a manner well known in the art and thus will not be described in this disclosure. The mower deck 17 has first and second ends 18,19, a top 29 and a deck extension 27. The deck extension 27 can be any component used with the mower deck 17 that extends in an upward direction above the top 29 of the mower deck 17. For the embodiment shown, the deck extension 27 is a gear box 28 that is used to operate cutting blades (not shown) within the mower deck 17 in a manner commonly known in the art. It should be noted that the deck extension 27 prevents the mower deck 17 from being removed from the side of the riding mower 11 when conventional deck attachment mechanisms are used.

With reference now to FIGS. 1–4, the riding mower 11 includes coupling means 26 for use in selectively coupling the drive shaft 13 to the mower deck 17. In the embodiment shown, the coupling means 26 is used to couple the drive shaft 13 to the gear box 28 of the mower deck 17. The coupling means 26 can be of any type currently known in the art and thus will not be described in detail. The riding mower 11 also includes lifting means 20 for selectively lifting the mower deck 17. The lifting means 20 can be of any type chosen with sound engineering judgement that both lifts and lowers the mower deck 17 as required. For the embodiment shown, the lifting means 20 includes a lift cylinder 22 and a rock shaft 23. The lift cylinder 22 may be a hydraulic cylinder. First and second rock shaft brackets 24, 25 are fixedly connected to the rock shaft 23 for rotational movement thereby. The lift cylinder 22 may have a piston member 36 with an opening 37 that receives a lift pin 38 that is operatively connected to the first rock shaft bracket 24. As the lift cylinder 22 selectively moves the piston member 36, the first rock shaft bracket 24 selectively rotates thereby rotating the rock shaft 23 and lifting the mower deck 17.

Figure 5:
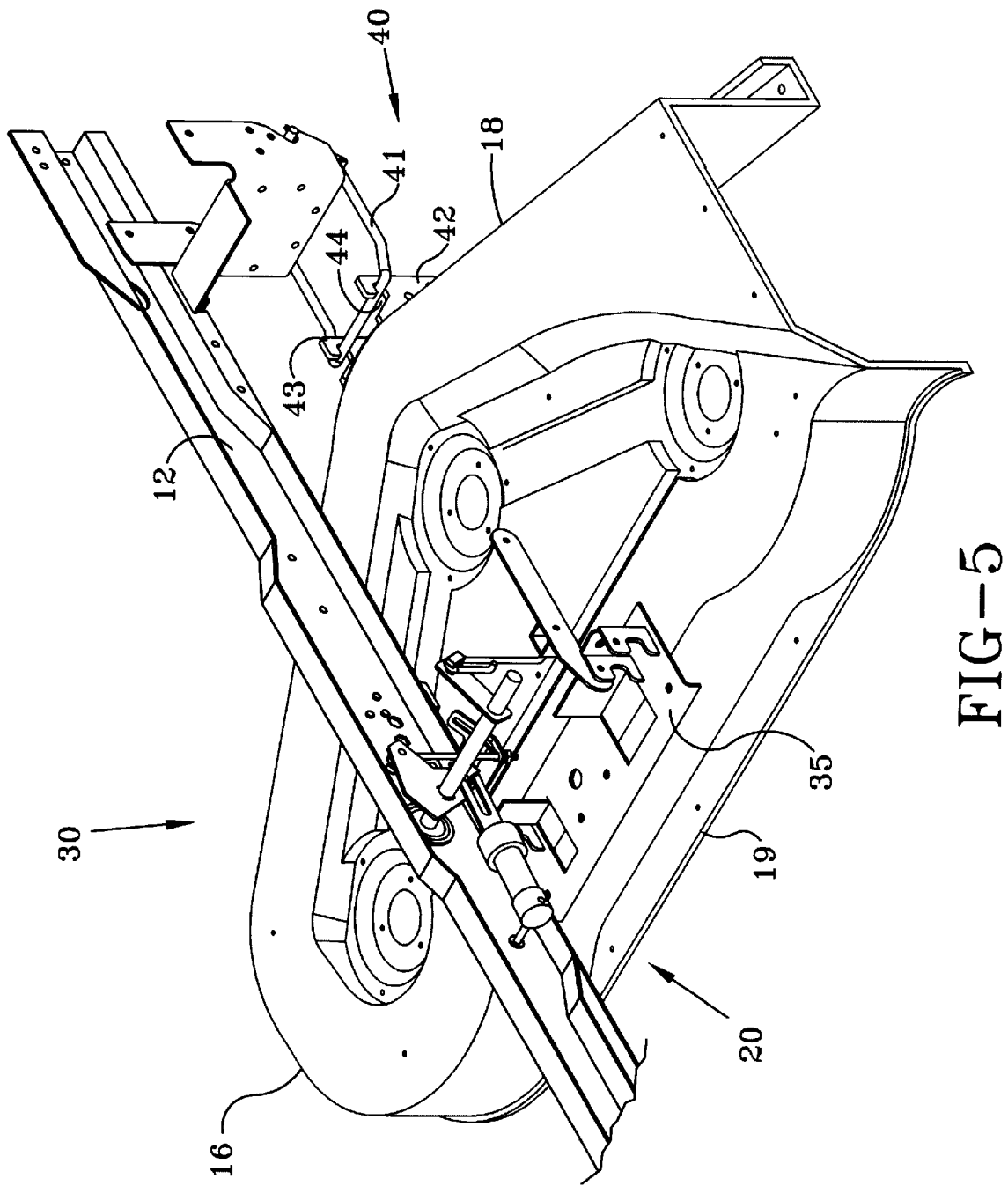
FIG. 5 is a partial perspective front end view of the deck attachment mechanism showing the first and second connection brackets used to attach the first end of the deck to the frame of the riding mower.

With reference now to FIGS. 1–2, and 5, the deck attachment mechanism 30 includes a first end link assembly 40 for use in operatively connecting the first end 18 of the mower deck 17 to the frame 12. The first end link assembly 40 can be of any type chosen with sound engineering judgement and this embodiment includes a connection bar 41 that is operatively connected to the frame 12. The first end link assembly 40 also includes first and second connection brackets 42, 43 that are fixedly attached to the first end 18 of the mower deck 17. It should be noted that only one connection bracket is required for this invention. The first connection bracket 42 has a first bar slot 44 that receives the connection bar 41. The second connection bracket 43 is similarly constructed.

Figure 3:
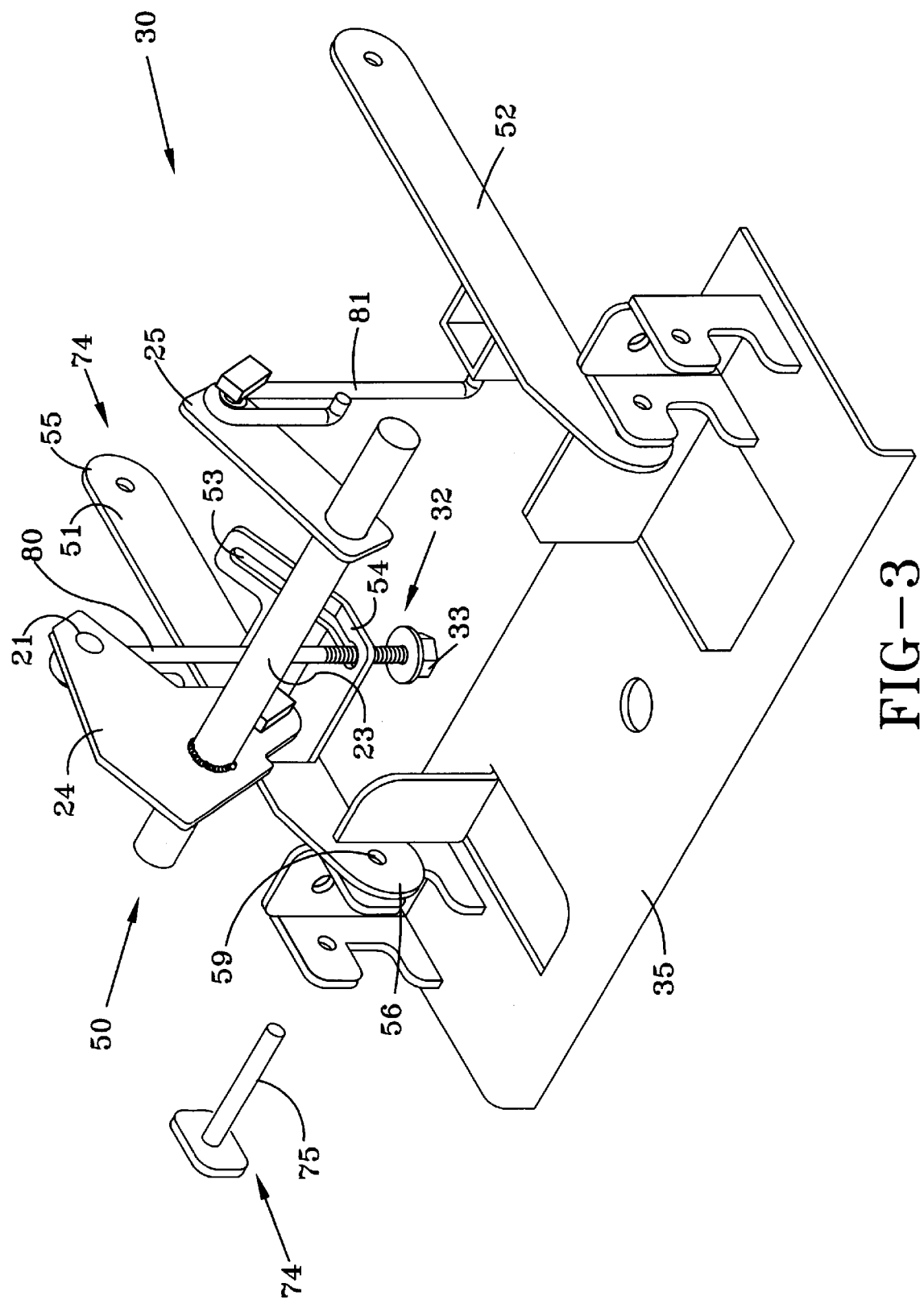
FIG. 3 is a perspective back end view of the deck attachment mechanism showing the deck bracket and the rock shaft.
Figure 4:
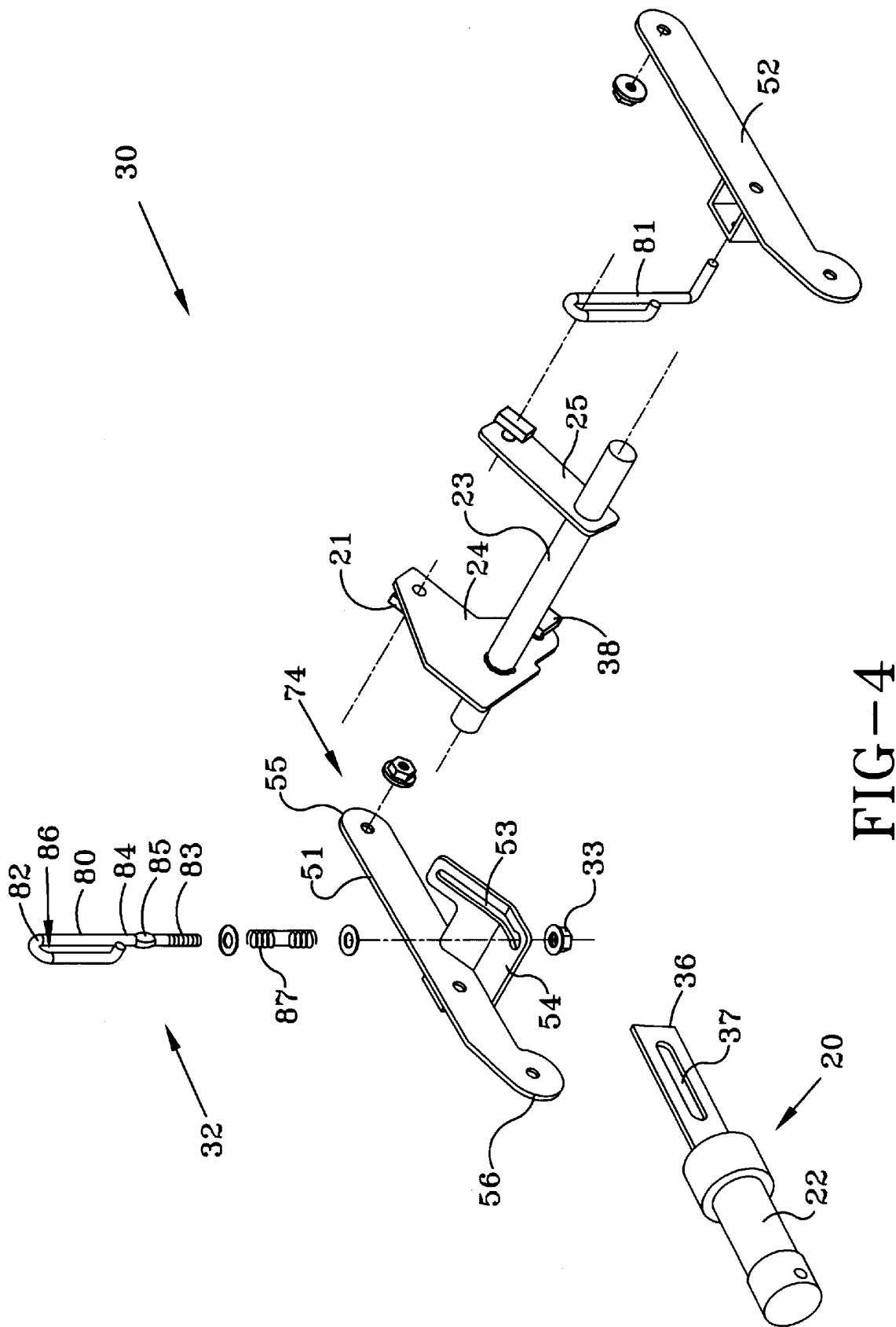
FIG. 4 is an assembly drawing of the deck attachment mechanism showing how the first lift rod is received by the first slot of the first link member.
Figure 6:
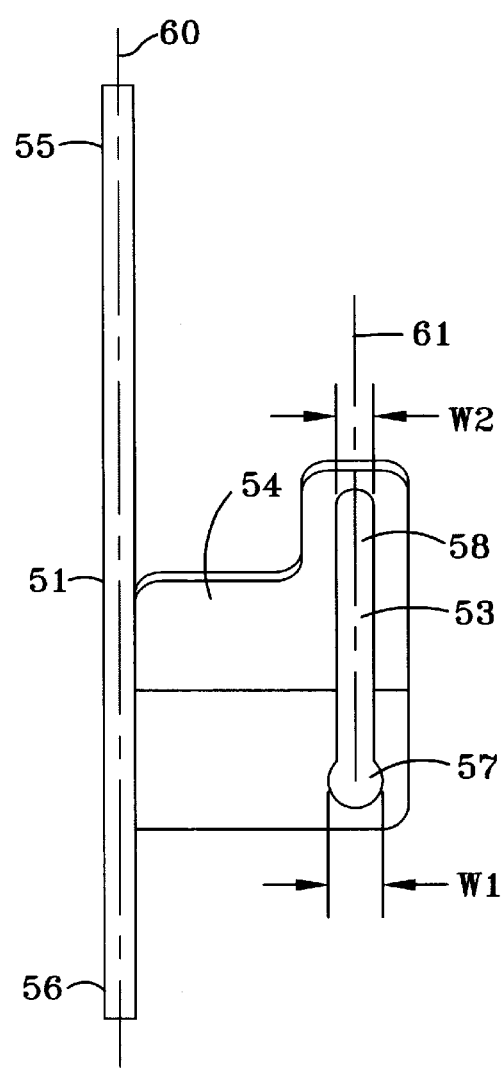
FIG. 6 is a plan view of the first link member showing the link arm and the first and second portions of the first link slot.

With reference now to FIGS. 1–4 and 6, the deck attachment mechanism 30 also includes a second end link assembly 50 for use in operatively connecting the second end 19 of the mower deck 17 to the frame 12. The second end link assembly 50 includes first and second link members 51, 52. It should be noted that only one link member is required for this invention. The first link member 51 has a link arm 54 with a first link slot 53 positioned therethrough. It should be noted that the link arm 54 can be a separate component or can be made integral with the first link member 51. As shown in FIG. 6, the first link member 51 has an axis of length 60 that is parallel and transverse to an axis of length 61 of the first link slot 53. It should be noted, as best seen in FIGS. 3 and 4, that the link arm 54 and the first link slot 53 are curved. By curved it is meant that neither the link arm 54 nor the first link slot 53 lie completely on a flat plane. The first link member 51 has first and second ends 55, 56. The first link slot 53, as best seen in FIG. 6, has a "key hole" shape and includes a first portion 57 having a first portion width W1 and a second portion 58 with a second portion width W2. The first portion width W1 is greater than the second portion width W2 for reasons to be disclosed below.

With reference now to FIGS. 1–4, the deck attachment mechanism 30 also includes frame connecting means 70 for selectively operatively connecting the first link member 51 to the frame 12. The frame connecting means 70 can be of any type chosen with sound engineering judgement but preferably includes the first end 55 of the first link member 51 being pivotably connected to the frame 12. The second link member 52 would be similarly pivotably connected to the frame 12.

With continuing reference to FIGS. 1–4, the deck attachment mechanism 30 also includes deck connecting means 74 for selectively operatively connecting the first link member 51 to the mower deck 17. The deck connecting means 74 can be of any type chosen with sound engineering judgement. In the preferred embodiment, the deck connecting means 74 includes a quick release pin 75 that can be of any type commonly known in the art. In this embodiment, the quick release pin 75 fits through holes in a deck bracket 35 that is fixedly connected to the deck 16 and through holes 59 in the second end 56 of the first link member 51. Another quick release pin 75 may also be used in a similar manner with the second link member 52.

With reference now to FIGS. 3–4 and 6–7, the deck attachment mechanism 30 also includes first and second lift rods 80, 81 that connect the second end link assembly 50 to the lifting means 20. It should be noted that only one lift rod is required for this invention. The first lift rod 80 has a first end 82 that is operatively connected to the lifting means 20 and a second end 83 that is operatively received within the first link slot 53 of the first link member 51. The first lift rod 80 is selectively slidable within the first link slot 53 in a manner to be disclosed further below.

Still referring to FIGS. 3–4 and 6–7, the first lift rod 80 has a mid-section 84 that includes a flatten area 85. The second end 83 of the first lift rod 80 has a second end width W3 and the flatten area 85 has a flatten area width W4. As can be clearly seen in FIG. 7, the second end width W3 is greater than the flatten area width W4. It should be noted that the second end width W3 is less than the first portion width W1 and greater than the second portion width W2 of the first link slot 53. The flatten area width W4 is less than the second portion W2. These width sizes are required in order for the first lift rod 80 to be properly received within the first link slot 53. In particular it should be noted that though the second end 83 of the first lift rod 80 is received within the first portion 57 of the first link slot 53, it cannot be received within the second portion 58. The flatten area 85 of the first lift rod 80, on the other hand, can be received by both the first and second portions 57, 58 of the first link slot 53. In other words, the first lift rod 80 cannot be sliden along the axis of length 61 of the first link slot 53 unless the flat flatten area 85 is aligned with the first link slot 53. In normal operation of the riding mower 11, the flatten area 85 is not aligned with the first link slot 53. A spring 87 fits around the first lift rod 80 between stacking 88 on the first lift rod 80 and the link arm 54. In this way the first lift rod 80 is prevented from sliding through the first link slot 53.

Figure 7:
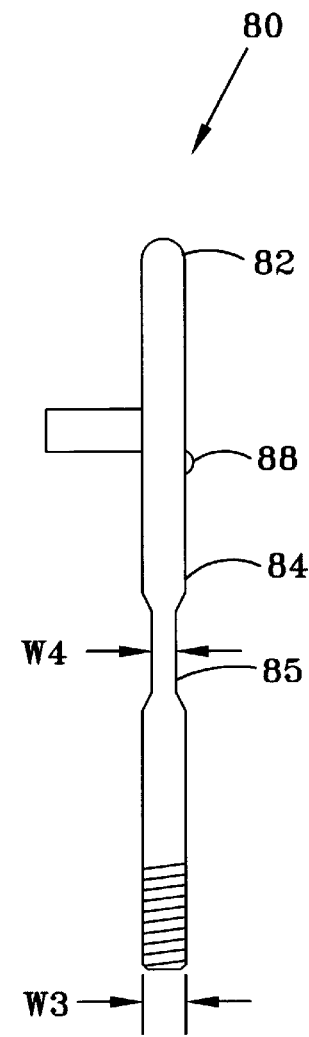
FIG. 7 is a back end elevation view of the first lift rod showing the flatten area that fits within the second portion of the first link slot.

With reference now to FIGS. 1–4 and 7, the riding mower 11 may also include leveling means 32 for use in leveling the mower deck 17. By leveling the mower deck 17, it is meant to control the side to side elevation of the mower deck 17. In the preferred embodiment, the leveling means 32 includes a threaded nut 33 that is operatively received by the second end 83 of the first lift rod 80. Thus the second end 83 of the first lift rod is also threaded, as shown in FIG. 7. By turning the threaded nut 33 about the second end 83 of the first lift rod 80 the mower deck 17 can be adjusted to the appropriate level.

With reference now to FIGS. 3–4, the first end 82 of the first lift rod 80 is formed into a first pivot loop 86. The second lift rod 81 may be similarly constructed. The first pivot loop 86 operatively receives a first pivot pin 21 that is operatively connected to the first rock shaft bracket 24, as seen in FIG. 3. Thus, the first lift rod 80 pivots about the first pivot pin 21 as the first lift rod 80 is slid within the first link slot 53.

With reference now to FIGS. 1–7, the mower deck 17 can be removed from the riding mower 11 in a manner that will now be described. First the mower deck 17 is moved away from the frame 12. This may be accomplished by lowering the mower deck 17 with the lifting means 20 in a downward direction until the mower deck 17 rests on the ground (not shown). Next, the deck connecting means 74 is disconnected. This may be accomplished in the preferred embodiment by disengaging one or more of the quick release pins 75. The first lift rod 80 must then be slid from the first portion 57 of the first link slot 53 to the end of the second portion 58. In the preferred embodiment, however, the first rod cannot be slid within the first link slot 53 until the flatten area 85 is aligned with the first link slot 53. Therefore, the first link member 51 is pushed in an upward direction with respect to the first lift rod 80. This compresses the spring 87 and positions the flatten area 85 in alignment with the first link slot 53. As the first lift rod 80 is then slid within the first link slot 53, the first lift rod 80 pivots about the first pivot pin 21. Next, the lifting means 20 is operated to raise the first link member 51 thereby providing appropriate clearance for the mower deck 17 (including the deck extension 27) to be removed from under the riding mower 11. The first end 18 of the mower deck 17 is then disconnected from the frame 12. In the preferred embodiment, this is accomplished by moving the mower deck 17 in a forward direction thereby releasing the connection bar 41 from the first bar slot 44 within the first connection bracket 42. The drive shaft 13 is then de-coupled from the mower deck 17 and finally the mower deck 17 is removed from the side of the riding mower 11.

The invention has been described with reference to the preferred embodiment. Obviously, modifications and alterations will occur to others upon a reading and understanding of the specification. It is intended by the applicant to include all such modifications and alterations insofar as they come within the scope of the appended claims or the equivalence thereof.

Having thus described the invention, it is now claimed:

1. A riding mower comprising:

a frame;

a drive shaft;

driving means for selectively rotating said drive shaft;

a mower deck having first and second ends;

coupling means for selectively coupling said drive shaft to said mower deck, said drive shaft selectively operating said mower deck;

lifting means for selectively lifting said mower deck; and, a deck attachment mechanism for attaching said mower deck to said frame and to said lifting means, said deck attachment mechanism including, A) a first end link assembly for use in operatively connecting said first end of said mower deck to said frame;

B) a second end link assembly for use in operatively connecting said second end of said mower deck to said frame, said second end link assembly including a first link member having a first link slot, said first link member having an axis of length, said first link member including a link arm, said first link slot being located within said link arm, said first link slot having an axis of length that is parallel and transverse to said axis of length of said first link member;

C) frame connecting means for selectively operatively connecting said first link member to said frame;

D) deck connecting means for selectively operatively connecting said first link member to said mower deck; and, E) a first lift rod having a first end operatively connected to said lifting means and a second end operatively received within said first link slot of said first link member, said first lift rod being selectively slidable within said first link slot.

2. The riding mower of claim 1 wherein said link arm and said first link slot are curved.

3. A riding mower comprising:

a frame;

a drive shaft;

driving means for selectively rotating said drive shaft;

a mower deck having first and second ends;

coupling means for selectively coupling said drive shaft to said mower deck, said drive shaft selectively operating said mower deck;

lifting means for selectively lifting said mower deck; and, a deck attachment mechanism for attaching said mower deck to said frame and to said lifting means, said deck attachment mechanism including, A) a first end link assembly for use in operatively connecting said first end of said mower deck to said frame;

B) a second end link assembly for use in operatively connecting said second end of said mower deck to said frame, said second end link assembly including a first link member having a first link slot, said first link slot having a key hole shape;

C) frame connecting means for selectively operatively connecting said first link member to said frame;

D) deck connecting means for selectively operatively connecting said first link member to said mower deck; and, E) a first lift rod having a first end operatively connected to said lifting means and a second end operatively received within said first link slot of said first link member, said first lift rod being selectively slidable within said first link slot.

4. The riding mower of claim 3 wherein said first link slot of said first link member has a first portion with a first portion width and a second portion with a second portion width, said first portion width being greater than said second portion width, said first lift rod comprising:

a midsection that includes a flattened area, said second end of said first lift rod having a second end width that is less than said first portion width and greater than said second portion width, said flattened area of said first lift rod being selectively slidable within said first and second portions of said first link slot.

5. A riding mower comprising:
a frame;
a drive shaft;
driving means for selectively rotating said drive shaft;
a mower deck having first and second ends;
coupling means for selectively coupling said drive shaft to said mower deck, said drive shaft selectively operating said mower deck;
lifting means for selectively lifting said mower deck; and,
a deck attachment mechanism for attaching said mower deck to said frame and to said lifting means, said deck attachment mechanism including,
   A) a first end link assembly for use in operatively connecting said first end of said mower deck to said frame;
   B) a second end link assembly for use in operatively connecting said second end of said mower deck to said frame, said second end link assembly including a first link member having a first link slot;
   C) frame connecting means for selectively operatively connecting said first link member to said frame;
   D) deck connecting means for selectively operatively connecting said first link member to said mower deck, said deck connecting means including a quick release pin; and,
   E) a first lift rod having a first end operatively connected to said lifting means and a second end operatively received within said first link slot of said first link member, said first lift rod being selectively slidable within said first link slot.

6. A riding mower comprising:
a frame;
a drive shaft;
driving means for selectively rotating said drive shaft;
a mower deck having first and second ends;
coupling means for selectively coupling said drive shaft to said mower deck, said drive shaft selectively operating said mower deck;
lifting means for selectively lifting said mower deck, said lifting means including a first pivot pin; and,
a deck attachment mechanism for attaching said mower deck to said frame and to said lifting means, said deck attachment mechanism including,
   A) a first end link assembly for use in operatively connecting said first end of said mower deck to said frame;
   B) a second end link assembly for use in operatively connecting said second end of said mower deck to said frame, said second end link assembly including a first link member having a first link slot;
   C) frame connecting means for selectively operatively connecting said first link member to said frame;
   D) deck connecting means for selectively operatively connecting said first link member to said mower deck; and,
   E) a first lift rod having a first end operatively connected to said lifting means and a second end operatively received within said first link slot of said first link member, said first end of said first lift rod forming a first pivot loop for operatively receiving said first pivot pin, said first lift rod being selectively pivotable about said first pivot pin, said first lift rod being selectively slidable within said first link slot.

7. A riding mower comprising:
a frame;
a drive shaft;
driving means for selectively rotating said drive shaft;
a mower deck having first and second ends;
coupling means for selectively coupling said drive shaft to said mower deck, said drive shaft selectively operating said mower deck;
lifting means for selectively lifting said mower deck;
a deck attachment mechanism for attaching said mower deck to said frame and to said lifting means said deck attachment mechanism including,
   A) a first end link assembly for use in operatively connecting said first end of said mower deck to said frame;
   B) a second end link assembly for use in operatively connecting said second end of said mower deck to said frame, said second end link assembly including a first link member having a first link slot;
   C) frame connecting means for selectively operatively connecting said first link member to said frame;
   D) deck connecting means for selectively operatively connecting said first link member to said mower deck; and,
   E) a first lift rod having a first end operatively connected to said lifting means and a second end operatively received within said first link slot of said first link member, said first lift rod being selectively slidable within said first link slot;
leveling means for leveling said mower deck, said leveling means including a threaded nut, said second end of said first lift rod operatively receiving said threaded nut, said threaded nut for use in adjusting the amount that said first lift rod extends through said first link slot of said first link member;
said first end link assembly including a connection bar operatively connected to said frame and a first connection bracket fixedly connected to said first end of said mower deck, said first connection bracket having a first bar slot for selectively receiving said connection bar;
said first link member having an axis of length, said first link member including a link arm, said first link slot being located within said link arm, said first link slot having an axis of length that is parallel and transverse to said axis of length of said first link member, said link arm and said first link slot being curved, said first link slot having a key hole shape with a first portion having a first portion width and a second portion having a second portion width, said second portion width being less than said first portion width, said first lift rod including a midsection that includes a flattened area, said second end of said first lift rod having a second end width that is less than said first portion width and greater than said second portion width, said flattened area of said first lift rod being selectively slidable within said first and second portions of said first link slot;
said frame connecting means including a first end of said first link member being pivotably connected to said frame;
said deck connecting means including a quick release pin; and,
said lifting means including a first pivot pin, said first end of said first lift rod forming a first pivot loop for operatively receiving said first pivot pin, said first lift rod being selectively pivotable about said first pivot pin.

8. A method for removing a mower deck having first and second ends from a riding mower with a deck attachment mechanism, said riding mower including a frame, a drive shaft for selectively operating said mower deck, driving means for selectively rotating said drive shaft, coupling means for selectively coupling said drive shaft to said mower deck, and lifting means for selectively lifting said mower deck, said deck attachment mechanism including a first end link assembly for use in operatively connecting said first end of said mower deck to said frame, a second end link assembly including a first link member having a first link slot for use in operatively connecting said second end of said mower deck to said frame, frame connecting means for selectively operatively connecting said first link member to the frame, deck connecting means for selectively operatively connecting said first link member to the associated deck and, a first lift rod having a first end operatively connected to the lifting means and a second end operatively received within said first link slot of said first link member, the method comprising the steps of:

disconnecting said deck connecting means;

sliding said first lift rod within said first link slot;

raising the first link member with the lifting means;

disconnecting said first end of said mower deck from said frame with said first end link assembly;

de-coupling said drive shaft from said mower deck with said coupling means;

removing the mower deck.

9. The method of claim 8 wherein, said step of disconnecting said deck connecting means, comprises the step of:

disengaging a quick release pin.

10. The method of claim 8 wherein, said step of disconnecting said first end of said mower deck from said frame with said first end link assembly, comprises the step of:

moving said mower deck in a forward direction.

11. The method of claim 8 wherein, before said step of disconnecting said deck connecting means, the method comprises the step of:

lowering said mower deck away from the frame with said lifting means.

12. The method of claim 8 wherein, before said step of sliding said first lift rod within said first link slot, the method comprises the steps of:

pushing said first link member in an upward direction with respect to said first lift rod;

compressing a spring that receives said first lift rod; and, positioning a flattened area of said first lift rod in alignment with said first link slot.

13. The method of claim 8 wherein, after the step of sliding said first lift rod within said first link slot, the method comprises the step of:

pivoting said first lift rod about said first end of said first lift rod.

14. A deck attachment mechanism for use in attaching a deck to a frame of an apparatus, the apparatus including lifting means for lifting the deck, said deck attachment mechanism comprising:

a first link member having first and second ends and a first link slot;

frame connecting means for selectively pivotably connecting said first end of said first link member to the frame;

deck connecting means for selectively operatively connecting said first link member to the deck, said deck connecting means including a quick release pin that fits through a hole in a deck bracket that is fixedly connected to the deck and through a hole in said second end of said first link member; and, a first lift rod having a first end operatively connected to the lifting means and a second end operatively received within said first link slot of said first link member, said first lift rod being selectively slidable within said first link slot.

15. A deck attachment mechanism for use in attaching an associated deck to a frame of an associated apparatus, the associated apparatus including lifting means for lifting the associated deck, said deck attachment mechanism comprising:

a first link member having a first link slot, said first link slot of said first link member having a first portion with a first portion width and a second portion with a second portion width, said second portion width being less than said first portion width;

frame connecting means for selectively operatively connecting said first link member to the frame;

deck connecting means for selectively operatively connecting said first link member to the associated deck; and, a first lift rod having a first end operatively connected to the lifting means and a second end operatively received within said first link slot of said first link member, said first lift rod having a midsection that includes a flattened area, said second end of said first lift rod having a second end width that is less than said first portion width and greater than said second portion width, said flattened area of said first lift rod being selectively slidable within said first and second portions of said first link slot.

16. The deck attachment mechanism of claim 15 wherein said first link member has an axis of length, said first link member comprising:

a link arm, said first link slot being located within said link arm, said first link slot having an axis of length that is parallel to said axis of length of said first link member, said link arm and said first link slot being curved.

17. The deck attachment mechanism of claim 16 wherein said second end of said first lift rod is threaded, said deck attachment mechanism further comprising:

leveling means for leveling the associated deck, said leveling means including a threaded nut, said second end of said first lift rod operatively receiving said threaded nut, said threaded nut for use in adjusting the amount that said first lift rod extends through said first link slot of said first link member.

18. The deck attachment mechanism of claim 17 wherein the lifting means includes a first pivot pin, said first end of said first lift rod forming a first pivot loop for operatively receiving said first pivot pin, said first lift rod being selectively pivotable about said first pivot pin.

19. A method for removing a deck from an apparatus with a deck attachment mechanism, the method comprising the steps of:

providing the apparatus with a frame and lifting means for lifting the deck;

providing the deck attachment mechanism with a first link member having first and second ends and a first link slot, frame connecting means for selectively pivotably connecting said first end of said first link member to the frame, deck connecting means for selectively operatively connecting said first link member to the deck, said deck connecting means including a quick release pin that fits through a hole in a deck bracket that is fixedly connected to the deck and through a hole in said second end of said first link member and, a first lift rod having a first end operatively connected to the lifting means and a second end operatively received within said first link slot of said first link member;

disconnecting said deck connecting means by removing said quick release pin;

sliding said lift rod within said first link slot;

lifting the first link member with the lifting means;

removing the associated deck.

20. The method of claim 19 wherein, before said step of disconnecting said deck connecting means, the method comprises the step of:

moving the associated deck away from the frame with said lifting means.

21. The method of claim 19 wherein, after said step of sliding said lift rod within said first link slot, the method comprises the step of:

pivoting said first lift rod about said first end of said first lift rod.

22. A method for removing an associated deck from an associated apparatus with a deck attachment mechanism, the associated apparatus including a frame and lifting means for lifting the associated deck, the deck attachment mechanism including a first link member having a first link slot, frame connecting means for selectively operatively connecting said first link member to the frame, deck connecting means for selectively operatively connecting said first link member to the associated deck and, a first lift rod having a first end operatively connected to the lifting means and a second end operatively received within said first link slot of said first link member, the method comprising the steps of:

disconnecting said deck connecting means;

pushing said first link member in an upward direction while holding said first lift rod;

compressing a spring that receives said first lift rod;

positioning a flattened area of said first lift rod in alignment with said first link slots;

sliding said lift rod within said first link slot;

lifting the first link member with the lifting means;

removing the associated deck.

* * * * *